(12) United States Patent
Fukukawa et al.

(10) Patent No.: US 9,828,027 B2
(45) Date of Patent: Nov. 28, 2017

(54) CONTROL SYSTEM FOR VEHICLE

(71) Applicants: AISIN SEIKI KABUSHIKI KAISHA, Kariya-shi, Aichi-ken (JP); TOYOTA JIDOSHA KABUSHIKI KAISHA, Toyota-shi, Aichi-ken (JP)

(72) Inventors: Shogi Fukukawa, Nagoya (JP); Takatomo Asai, Nagoya (JP); Motonari Obayashi, Nagakute (JP); Hironobu Ishijima, Toyota (JP)

(73) Assignees: AISIN SEIKI KABUSHIKI KAISHA, Aichi-ken (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/850,088

(22) Filed: Sep. 10, 2015

(65) Prior Publication Data

US 2016/0075373 A1 Mar. 17, 2016

(30) Foreign Application Priority Data

Sep. 12, 2014 (JP) ................. 2014-186769

(51) Int. Cl.
 *B62D 15/02* (2006.01)
 *B62D 1/28* (2006.01)
 *B62D 6/00* (2006.01)

(52) U.S. Cl.
 CPC ............ *B62D 15/021* (2013.01); *B62D 1/28* (2013.01); *B62D 6/002* (2013.01); *B62D 15/027* (2013.01); *B62D 15/0285* (2013.01)

(58) Field of Classification Search
 CPC .................................................. B62D 5/0835
 See application file for complete search history.

(56) References Cited

U.S. PATENT DOCUMENTS

| | | | |
|---|---|---|---|
| 8,457,843 B2 * | 6/2013 | Niemz ................. | B62D 5/0469 180/204 |
| 2011/0125368 A1 * | 5/2011 | Yokota ................ | B60T 8/17554 701/41 |

(Continued)

FOREIGN PATENT DOCUMENTS

| | | |
|---|---|---|
| JP | 2000-66727 A | 3/2000 |
| JP | 2006-8009 A | 1/2008 |

(Continued)

OTHER PUBLICATIONS

English translation of JP 2013-112188A, translated via ESPACENET, attached to the original non-translated foreign document.*

(Continued)

*Primary Examiner* — John R Olszewski
*Assistant Examiner* — Tommy Worden
(74) *Attorney, Agent, or Firm* — Sughrue Mion, PLLC

(57) ABSTRACT

A control system for a vehicle includes a steering control unit and an electronic control unit. The steering control unit is configured to control a steering angle of a wheel of the vehicle. The electronic control unit is configured to acquire a target steering angle set as a target to move the vehicle, adjust the acquired target steering angle such that the target steering angle does not exceed a first guard value determined in order to inhibit a change in the steering angle of the vehicle, larger than or equal to a first reference, output the adjusted target steering angle to the steering control unit in order for the steering control unit to control the steering angle to the adjusted target steering angle, and change the first guard value in response to a situation of the vehicle.

2 Claims, 10 Drawing Sheets

(56) References Cited

U.S. PATENT DOCUMENTS

2013/0184925 A1* 7/2013 Niemz .................. B60W 30/09
  701/25
2016/0039455 A1* 2/2016 Zeller .................... B62D 7/159
  701/41

FOREIGN PATENT DOCUMENTS

| JP | 2013-112188 A | | 6/2013 |
| JP | 2013112188 A | * | 6/2013 |
| JP | 2014-54885 A | | 3/2014 |

OTHER PUBLICATIONS

Communication dated Jul. 26, 2016 from the Japanese Patent Office in counterpart application No. 2014-186769.

* cited by examiner

CONTROL SYSTEM FOR VEHICLE

INCORPORATION BY REFERENCE

The disclosure of Japanese Patent Application No. 2014-186769 filed on Sep. 12, 2014 including the specification, drawings and abstract is incorporated herein by reference in its entirety.

BACKGROUND OF THE INVENTION

1. Field of the Invention

The invention relates to a control system for a vehicle.

2. Description of Related Art

Generally, there is known a technique for steering assist or automatic steering for causing a vehicle to travel along a moving trajectory in order to guide the vehicle to a target position (for example, Japanese Patent Application Publication No. 2006-8009 (JP 2006-8009 A), Japanese Patent Application Publication No. 2013-112188 (JP 2013-112188 A)).

However, in the existing art, a vehicle is just caused to move along a preset moving path, and a ride comfort in the case where the vehicle is steered so as to travel along the moving path is not considered so much.

SUMMARY OF THE INVENTION

An aspect of the invention provides a control system for a vehicle. The control system includes a steering control unit and an electronic control unit. The steering control unit is configured to control a steering angle of a wheel of the vehicle. The electronic control unit is configured to acquire a target steering angle set as a target to move the vehicle, adjust the acquired target steering angle such that the target steering angle does not exceed a first guard value determined in order to inhibit a change in the steering angle of the vehicle, larger than or equal to a first reference, output the adjusted target steering angle to the steering control unit in order for the steering control unit to control the steering angle to the adjusted target steering angle, and change the first guard value in response to a situation of the vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is an exemplary perspective view of a vehicle according to an embodiment in a state where part of a cabin is seen through;

DETAILED DESCRIPTION OF EMBODIMENTS

Hereinafter, an exemplary embodiment of the invention will be described. The configuration of the embodiment described below, and the operation, results and advantageous effects obtained from the configuration are illustrative. The invention may be implemented by a configuration other than the configuration that will be described in the following embodiment, and may obtain at least one of various advantageous effects based on a basic configuration or secondary advantageous effects.

A vehicle 1 according to the present embodiment may be, for example, an automobile that uses an internal combustion engine (not shown) as a drive source, that is, an internal combustion engine automobile, may be an automobile that uses an electric motor (not shown) as a drive source, that is, an electric automobile, a fuel-cell automobile, or the like, may be a hybrid automobile that uses both the internal combustion engine and the electric motor as drive sources, or may be an automobile including another drive source. Various transmissions may be mounted on the vehicle 1. Various devices, such as system and components, required to drive an internal combustion engine or an electric motor may be mounted on the vehicle 1. The system, number, layout, and the like, of a device related to driving of wheels 3 in the vehicle 1 may be variously set.

Figure 1:
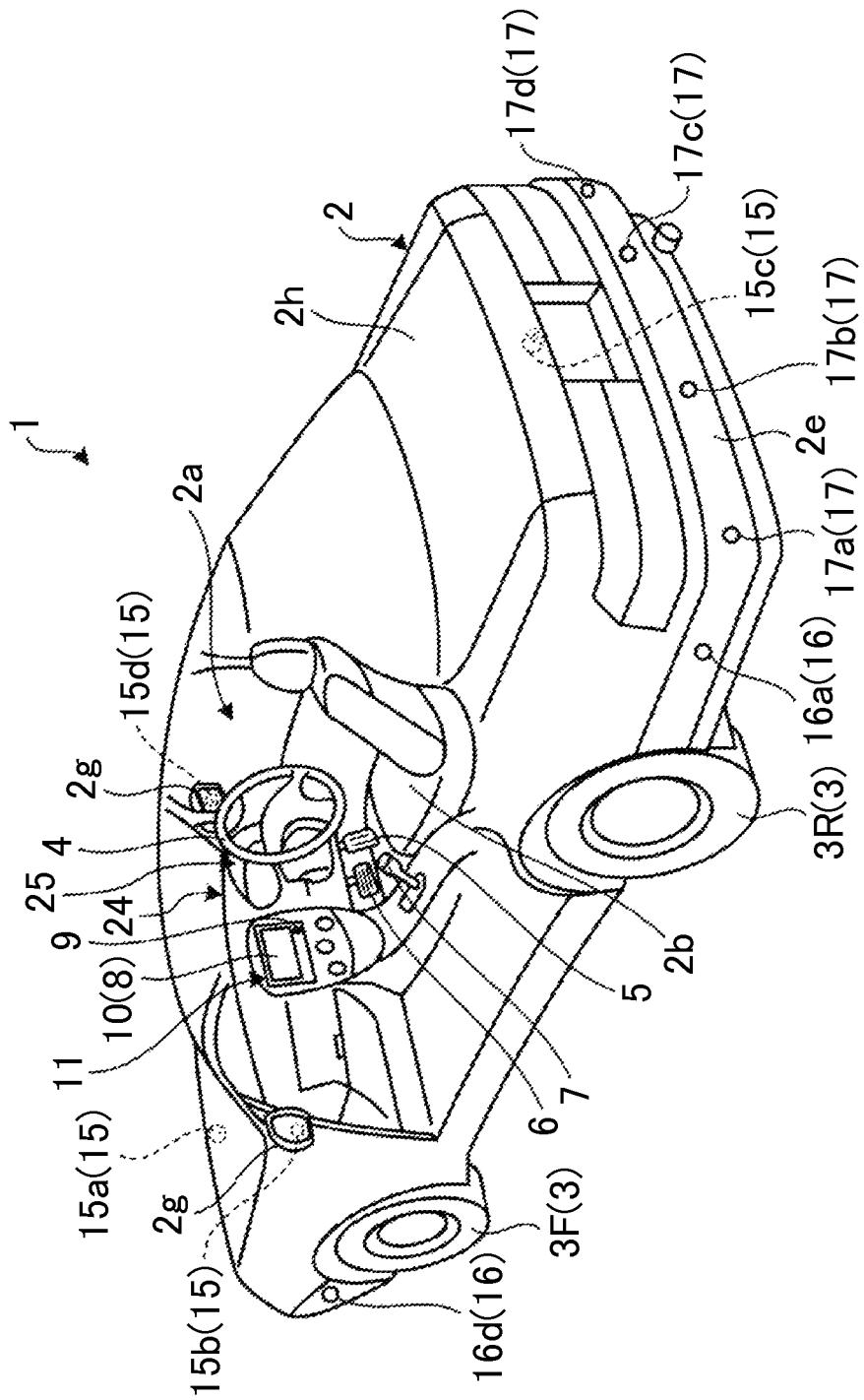

As illustrated in FIG. 1, a vehicle body 2 constitutes a cabin 2a in which an occupant (not shown) is seated. A steering unit 4, an accelerator operation unit 5, a brake operation unit 6, a shift operation unit 7, and the like, are provided near a seat 2b of a driver as an occupant inside the cabin 2a. The steering unit 4 is, for example, a steering wheel projecting from a dashboard 24. The accelerator operation unit 5 is, for example, an accelerator pedal located near driver's foot. The brake operation unit 6 is, for example, a brake pedal located near driver's foot. The shift operation unit 7 is, for example, a shift lever projecting from a center console. The steering unit 4, the accelerator operation unit 5, the brake operation unit 6, the shift operation unit 7, and the like, are not limited to these components.

A display device 8 and an audio output device 9 are provided inside the cabin 2a. The display device 8 serves as a display output unit. The audio output device 9 serves as an audio output unit. The display device 8 is, for example, a liquid crystal display (LCD), an organic electroluminescent display (OELD), or the like. The audio output device 9 is, for example, a speaker. The display device 8 is, for example, covered with a translucent operation input unit 10, such as a touch panel. An occupant is allowed to visually recognize an image that is displayed on the display screen of the display device 8 via the operation input unit 10. An occupant is allowed to perform an input operation by operating the operation input unit 10 through touching, pressing or moving the operation input unit 10 with a finger, or the like, at a position corresponding to an image that is displayed on the display screen of the display device 8. These display device 8, audio output device 9, operation input unit 10, and the like, are, for example, provided in a monitor device 11 located at the center in the vehicle width direction, that is, transverse direction, of the dashboard 24. The monitor device 11 may have an operation input unit (not shown), such as a switch, a dial, a joystick and a push button. An audio output device (not shown) may be provided at another position inside the cabin 2a, different from the monitor device 11. Audio may be output from the audio output device 9 of the monitor device 11 and another audio output device. The monitor device 11 is, for example, shared with a navigation system or an audio system.

Figure 3:
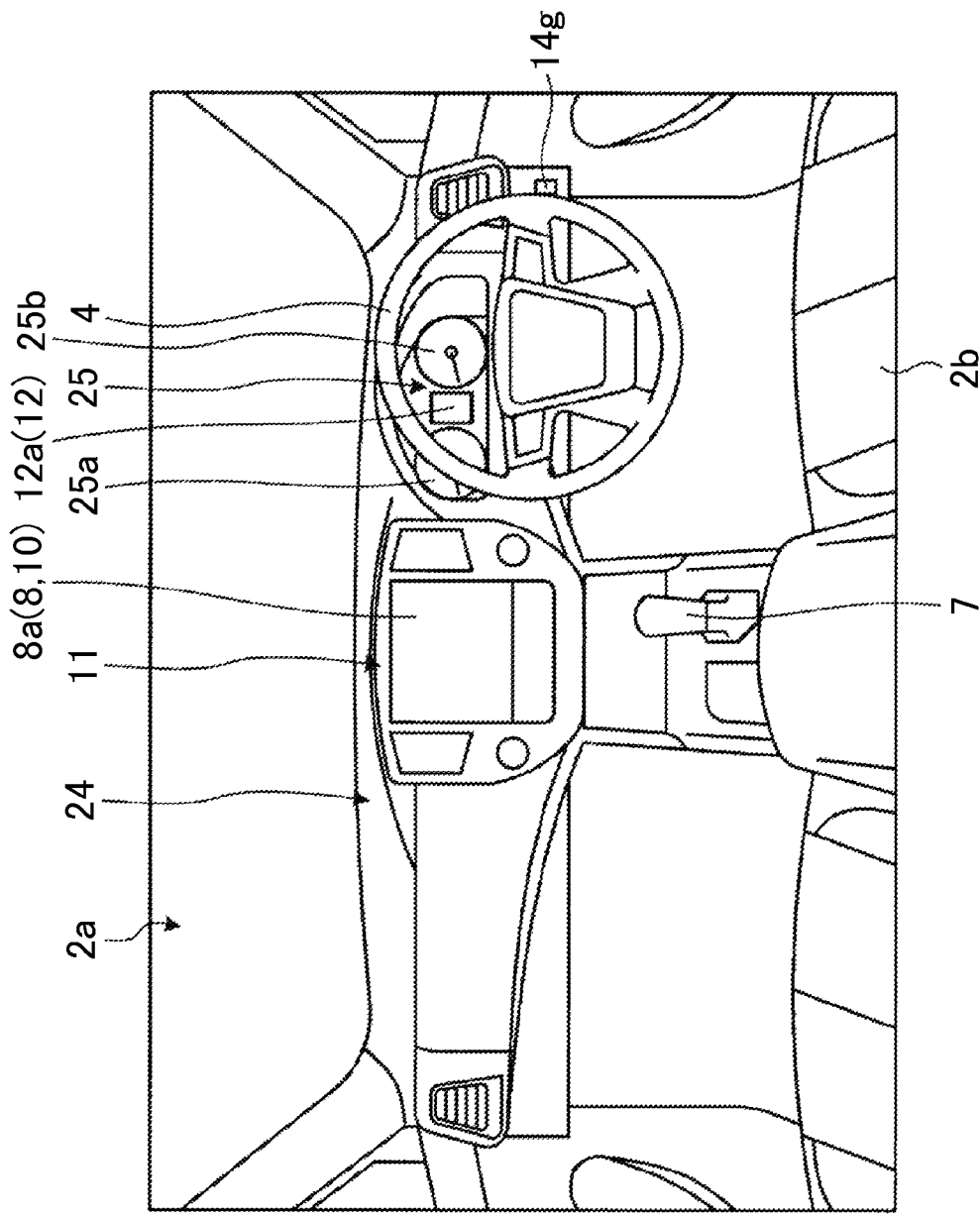
FIG. 3 is a view of an example of a dashboard of the vehicle according to the embodiment when viewed from the rear side of the vehicle.

A display device 12 different from the display device 8 is provided inside the cabin 2a. As shown in FIG. 3, the display device 12 is, for example, provided in an instrument panel unit 25 in the dashboard 24, and is located at substantially the center of the instrument panel unit 25 between a speed indicating unit 25a and a rotation speed indicating unit 25b. The size of the screen 12a of the display device 12 is smaller than the size of the screen 8a (FIG. 3) of the display device 8. An image that shows information for assisting in parking the vehicle 1 may be mainly displayed on the display device 12. The amount of information that is displayed on the display device 12 may be smaller than the amount of information that is displayed on the display device 8. The display device 12 is, for example, an LCD, an OELD, or the like. Information that is displayed on the display device 12 may be displayed on the display device 8.

Figure 2:
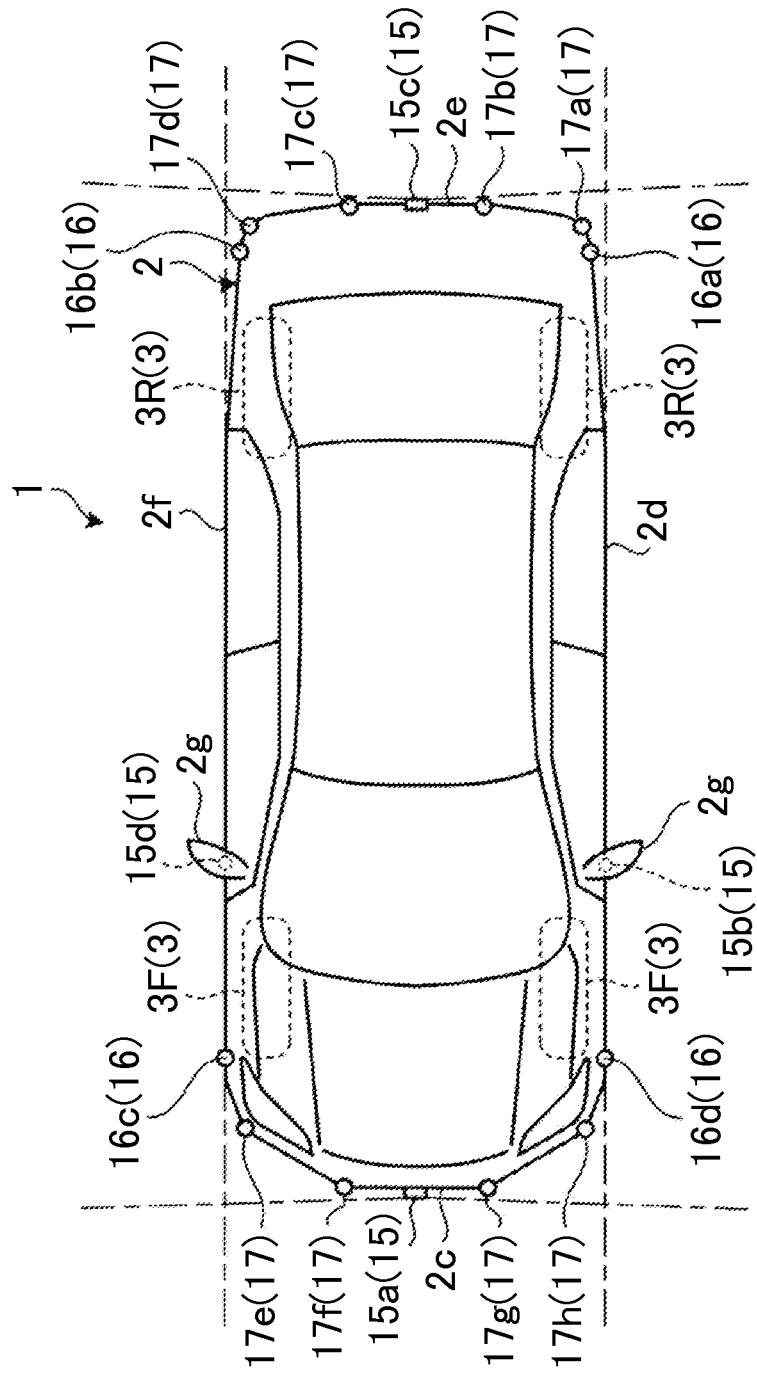
FIG. 2 is an exemplary plan view (bird's eye view) of the vehicle according to the embodiment.
Figure 4:
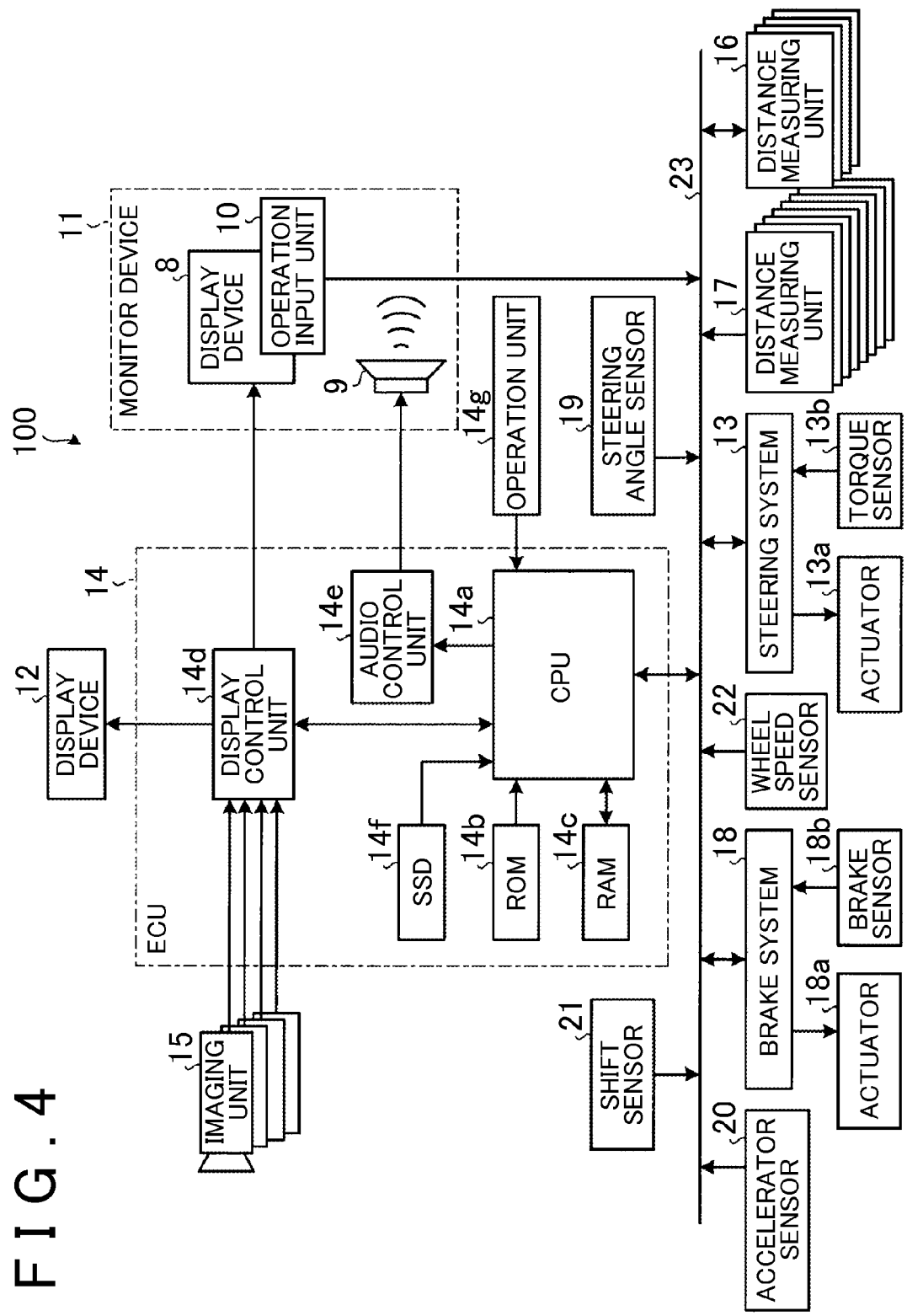
FIG. 4 is an exemplary block diagram of the configuration of a parking assist system according to the embodiment.

As illustrated in FIG. 1 and FIG. 2, the vehicle 1 is, for example a four-wheel vehicle, and includes two right and left front wheels 3F and two right and left rear wheels 3R. Each of these four wheels 3 may be configured to be steerable. As illustrated in FIG. 4, the vehicle 1 includes a steering system 13 that steers at least two of the wheels 3. The steering system 13 includes an actuator 13a and a torque sensor 13b. The steering system 13 is electrically controlled by an electronic control unit (ECU) 14, or the like, to actuate the actuator 13a. The steering system 13 is, for example, an electric power steering system, a steer-by-wire (SBW) system, or the like. The steering system 13 adds torque, that is, assist torque, to the steering unit 4 with the use of the actuator 13a to compensate for steering force or steers the wheels 3 with the use of the actuator 13a. In this case, the actuator 13a may steer one of the wheels 3 or may steer a plurality of the wheels 3. The torque sensor 13b, for example, detects a torque that is applied to the steering unit 4 by a driver.

As illustrated in FIG. 2, for example, four imaging units 15a to 15d are provided on the vehicle body 2 as a plurality of imaging units 15. Each of the imaging units 15 is, for example, a digital camera that incorporates an imaging device, such as a charge coupled device (CCD) and a CMOS image sensor (CIS). Each of the imaging units 15 is able to output moving image data at a predetermined frame rate. Each of the imaging units 15 has a wide angle lens or a fisheye lens, and is able to capture an image in, for example, the range of 140° to the range of 190° in the horizontal direction. The optical axis of each of the imaging units 15 is set so as to be oriented obliquely downward. Thus, each of the imaging units 15 sequentially captures a road surface on which the vehicle 1 is allowed to move and an outside environment around the vehicle body 2, including an area in which the vehicle 1 is allowed to be parked, and outputs the captured image as captured image data.

The imaging unit 15a is, for example, located at the front of the vehicle body 2, that is, a front end 2c in the vehicle longitudinal direction, and is provided at a front bumper, or the like. The imaging unit 15b is, for example, located at the left side of the vehicle body 2, that is, a left-side end 2d in the vehicle width direction, and is provided at a door mirror 2g that serves as a left-side projecting portion. The imaging unit 15c is, for example, located at a rear end 2e of the vehicle body 2, and is provided at a lower wall portion of a door 2h of a rear boot. The imaging unit 15d is, for example, located at a right-side end 2f of the vehicle body 2, and is provided at a right-side door mirror 2g. The ECU 14 is able to generate an image having a wider viewing angle or generate an imaginary bird's-eye image of the vehicle 1 from above by executing operation processing and image processing on the basis of the image data obtained by the imaging units 15. A bird's-eye image may be referred to as plan image.

The ECU 14 identifies partition lines, or the like, on a road surface around the vehicle 1 from the images of the imaging units 15, and detects (extracts) parking spaces indicated by the partition lines, or the like.

As illustrated in FIG. 1 and FIG. 2, for example, four distance measuring units 16a to 16d and eight distance measuring units 17a to 17h are provided on the vehicle body 2 as a plurality of distance measuring units 16, 17. Each of the distance measuring units 16, 17 is, for example, a sonar that emits ultrasonic wave and captures the reflected wave. The sonar may also be referred to as a sonar sensor or an ultrasonic detector. The ECU 14 is able to detect whether there is an object, such as an obstacle, located around the vehicle 1 or measure a distance to the object on the basis of the detected results of the distance measuring units 16, 17. That is, each of the distance measuring units 16, 17 is an example of a detection unit that detects an object. Each of the distance measuring units 17 may be, for example, used to detect an object at a relatively close distance. Each of the distance measuring units 16 may be, for example, used to detect an object at a relatively long distance, which is distant from an object that each of the distance measuring units 17 detects. The distance measuring units 17 may be, for example, used to detect an object ahead of or behind the vehicle 1. The distance measuring units 16 may be, for example, used to detect an object to the side of the vehicle 1.

As illustrated in FIG. 4, in a parking assist system 100, in addition to the ECU 14, the monitor device 11, the steering system 13, the distance measuring units 16, 17, and the like, a brake system 18, a steering angle sensor 19, an accelerator sensor 20, a shift sensor 21, a wheel speed sensor 22, and the like, are electrically connected to one another via an in-vehicle network 23 that serves as an electric communication line. The in-vehicle network 23 is, for example, provided as a controller area network (CAN). The ECU 14 is able to control the steering system 13, the brake system 18, and the like, by transmitting control signals through the in-vehicle network 23. The ECU 14 is able to receive detected results of the torque sensor 13b, a brake sensor 18b, the steering angle sensor 19, the distance measuring units 16, the distance measuring units 17, the accelerator sensor 20, the shift sensor 21, the wheel speed sensor 22, and the like, and operation signals of the operation input unit 10, and the like, via the in-vehicle network 23.

The ECU 14, for example, includes a central processing unit (CPU) 14a, a read only memory (ROM) 14b, a random access memory (RAM) 14c, a display control unit 14d, an audio control unit 14e, a solid state drive or flash memory (SSD) 14f, and the like. The CPU 14a is, for example, able to execute various operation processing and control, such as image processing related to images that are displayed on the display devices 8, 12, determination of a moving target position of the vehicle 1, computation of a moving path of the vehicle 1, determination as to whether there is an interference with an object, automatic control over the vehicle 1, and cancellation of automatic control. The CPU 14a is able to read a program installed and stored in a nonvolatile storage device, such as the ROM 14b, and execute operation processing in accordance with the program. The RAM 14c temporarily stores various pieces of data that are used for computation in the CPU 14a. The display control unit 14d mainly executes image processing by the use of image data obtained by the imaging units 15, synthesis of image data that are displayed on the display device 8, and the like, within the operation processing in the ECU 14. The audio control unit 14e mainly processes audio data that are output from the audio output device 9 within the operation processing in the ECU 14. The SSD 14f is a rewritable nonvolatile storage unit, and is able to store data even when the power of the ECU 14 is turned off. The CPU 14a, the ROM 14b, the RAM 14c, and the like, may be integrated within the same package. The ECU 14 may be formed of another logical operation processor, such as a digital signal processor (DSP), a logical circuit, or the like, instead of the CPU 14a. A hard disk drive (HDD) may be provided instead of the SSD 14f. The SSD 14f or the HDD may be provided separately from the ECU 14.

The brake system 18 is, for example, an anti-lock brake system (ABS) that prevents the brake from locking up the wheels, a side slip prevention device (electronic stability control (ESC)) that prevents a side slip of the vehicle 1 during cornering, an electric brake system that enhances brake force (performs brake assist), a brake-by-wire (BBW), or the like. The brake system 18 imparts braking force to the wheels 3 and, by extension, the vehicle 1, via the actuator 18a. The brake system 18 is able to execute various controls by detecting locking up of the wheels by the brake, a spin of the wheels 3, a sign of a side slip, and the like, from, for example, a rotation difference between the right and left wheels 3. The brake sensor 18b is, for example, a sensor that detects the position of a movable unit of the brake operation unit 6. The brake sensor 18b is able to detect the position of the brake pedal that serves as the movable unit. The brake sensor 18b includes a displacement sensor.

The steering angle sensor 19 is, for example, a sensor that detects a steering amount of the steering unit 4, such as the steering wheel. The steering angle sensor 19 is, for example, provided by using a Hall element, or the like. The ECU 14 acquires a driver's steering amount of the steering unit 4, a steering amount of each wheel 3 during automatic steering, or the like, from the steering angle sensor 19, and executes various controls. The steering angle sensor 19 detects a rotation angle of a rotating portion included in the steering unit 4. The steering angle sensor 19 is an example of an angle sensor.

The accelerator sensor 20 is, for example, a sensor that detects the position of a movable unit of the accelerator operation unit 5. The accelerator sensor 20 is able to detect the position of the accelerator pedal that serves as the movable unit. The accelerator sensor 20 includes a displacement sensor.

The shift sensor 21 is, for example, a sensor that detects the position of a movable unit of the shift operation unit 7. The shift sensor 21 is able to detect the position of a lever, an arm, a button, or the like, that serves as the movable unit. The shift sensor 21 may include a displacement sensor or may be provided as a switch.

The wheel speed sensor 22 is a sensor that detects a rotation amount or rotation speed of each wheel 3 per unit time. The wheel speed sensor 22 outputs a wheel speed pulse number, indicating the detected rotation speed, as a sensor value. The wheel speed sensor 22 may be, for example, provided by using a Hall element, or the like. The ECU 14 computes a moving amount, and the like, of the vehicle 1 on the basis of the sensor value acquired from the wheel speed sensor 22, and executes various controls. There is a case where the wheel speed sensor 22 is provided in the brake system 18. In this case, the ECU 14 acquires the detected result of the wheel speed sensor 22 via the brake system 18.

The configurations, arrangement, electrical connection modes, and the like, of the above-described various sensors and actuators are illustrative, and may be variously set (changed).

Figure 5:
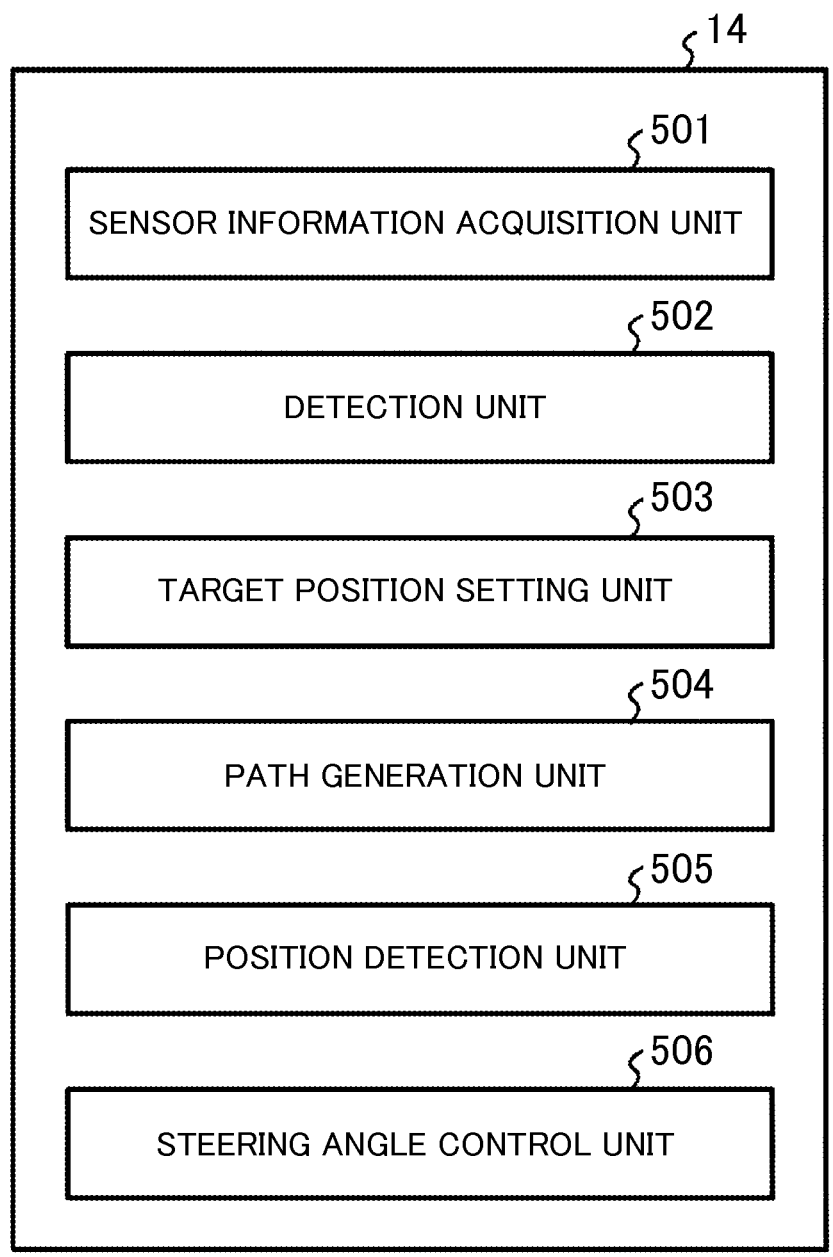
FIG. 5 is an exemplary block diagram of the configuration of an ECU of the parking assist system according to the embodiment.

As shown in FIG. 5, the ECU 14 includes a sensor information acquisition unit 501, a detection unit 502, a target position setting unit 503, a path generation unit 504, a position detection unit 505 and a steering angle control unit 506. The components shown in FIG. 5 are implemented when the CPU 14a of the ECU 14 executes programs stored in the ROM 14b. These components may be configured to be implemented by hardware.

The ECU 14 in the vehicle 1 according to the present embodiment performs parking assist for guiding the vehicle 1 to a target position (for example, a parking position of the vehicle 1). For example, the ECU 14 according to the present embodiment displays guide information on the display device 12 to prompt a driver to operate the accelerator pedal, the brake pedal and the shift operation unit 7. For example, when the driver operates at least one or more of the accelerator pedal and the shift operation unit 7 in accordance with the guide information and then the vehicle 1 has moved, the ECU 14 controls the steering system 13 in accordance with a distance the vehicle 1 has moved such that the vehicle 1 moves along a set moving path. Thus, because steering commensurate with the moved distance is performed, the vehicle 1 is able to move to the target position.

The sensor information acquisition unit 501 acquires information from various sensors provided in the vehicle 1. The sensor information acquisition unit 501 according to the present embodiment acquires wheel speed information from the wheel speed sensor 22, measured distance information from the distance measuring units 16, 17, steering angle information from the steering angle sensor 19, accelerator information from the accelerator sensor 20, shift information from the shift sensor 21, brake information from the brake sensor 18b, and steering torque information from the torque sensor 13b. The sensor information acquisition unit 501 according to the present embodiment acquires speed information of the vehicle 1 on the basis of the wheel speed information from the wheel speed sensor 22. In addition, the sensor information acquisition unit 501 may acquire an acceleration from an acceleration sensor (not shown).

The detection unit 502 detects an obstacle around the vehicle 1 on the basis of the measured distance information acquired by the sensor information acquisition unit 501 from the distance measuring units 16, 17. The detection unit 502 detects an area in which the vehicle 1 is allowed to be parked on the basis of the measured distance information acquired by the sensor information acquisition unit 501 from the distance measuring units 16, 17.

The target position setting unit 503 sets a target position that is a destination to which the vehicle 1 moves. The target position setting unit 503 according to the present embodiment sets the target position to the area in which the vehicle 1 is allowed to be parked, which is detected by the detection unit 502. When there are a plurality of available parking areas, the area selected from among the plurality of available parking areas by the driver via the operation unit 14g is set for the target position.

The path generation unit 504 generates a moving path of the vehicle 1 to the target position set by the target position setting unit 503. The path generation unit 504 according to the present embodiment may set a switching point at which the traveling direction of the vehicle 1 is changed, and then generate the moving path.

The position detection unit 505 detects the current position of the vehicle 1. The position detection unit 505 according to the present embodiment detects the current position of the moving vehicle 1 on the basis of the measured distance information, steering angle information, wheel speed information and speed information of the vehicle 1, acquired by the sensor information acquisition unit 501.

The steering angle control unit 506 directs the steering system 13 toward a steering angle on the basis of the moving path set by the path generation unit 504 and the current position detected by the position detection unit 505 such that the vehicle 1 travels along the moving path. The steering system 13 controls the actuator 13a in accordance with the directed steering angle.

Incidentally, in the existing technique of steering assist or automatic steering, a vehicle is controlled to move to a target position along a generated moving path. Therefore, abrupt steering is allowed depending on a generated moving path. When abrupt steering is performed, there is a possibility that an occupant experiences a discomfort or an occupant is frightened.

That is, as a variation in lateral G (a temporally differential value of a lateral G) of the vehicle due to abrupt steering, or the like, increases, an occupant experiences a discomfort. The lateral G is an inertial force that is generated in the lateral direction perpendicular to the traveling direction of the vehicle in a moving plane (ground plane) of the vehicle 1.

Incidentally, a human is more sensitive to a change in lateral G than the magnitude of lateral G. Therefore, a human tends to be frightened or feels discomfort from a change in lateral G rather than the magnitude of lateral G.

The change in lateral G corresponds to a steering speed (a variation in steering angle per unit time or a temporally differential value of a steering angle). That is, as the steering speed increases, the variation in lateral G increases. In other words, by suppressing an abrupt change in steering speed, it is possible to inhibit generation of a lateral G that makes an occupant feel uncomfortable.

The steering angle control unit 506 according to the present embodiment executes control for limiting a steering angle toward which the steering system 13 is directed (hereinafter, referred to as command steering angle) such that the steering speed does not abruptly change. In the present embodiment, a guard value for limiting the command steering angle is set; however, as described above, a steering speed that is a variation in steering angle per unit time works with a sense of human. Therefore, the steering angle control unit 506 changes the guard value for limiting the command steering angle in response to the steering speed.

Figure 6:
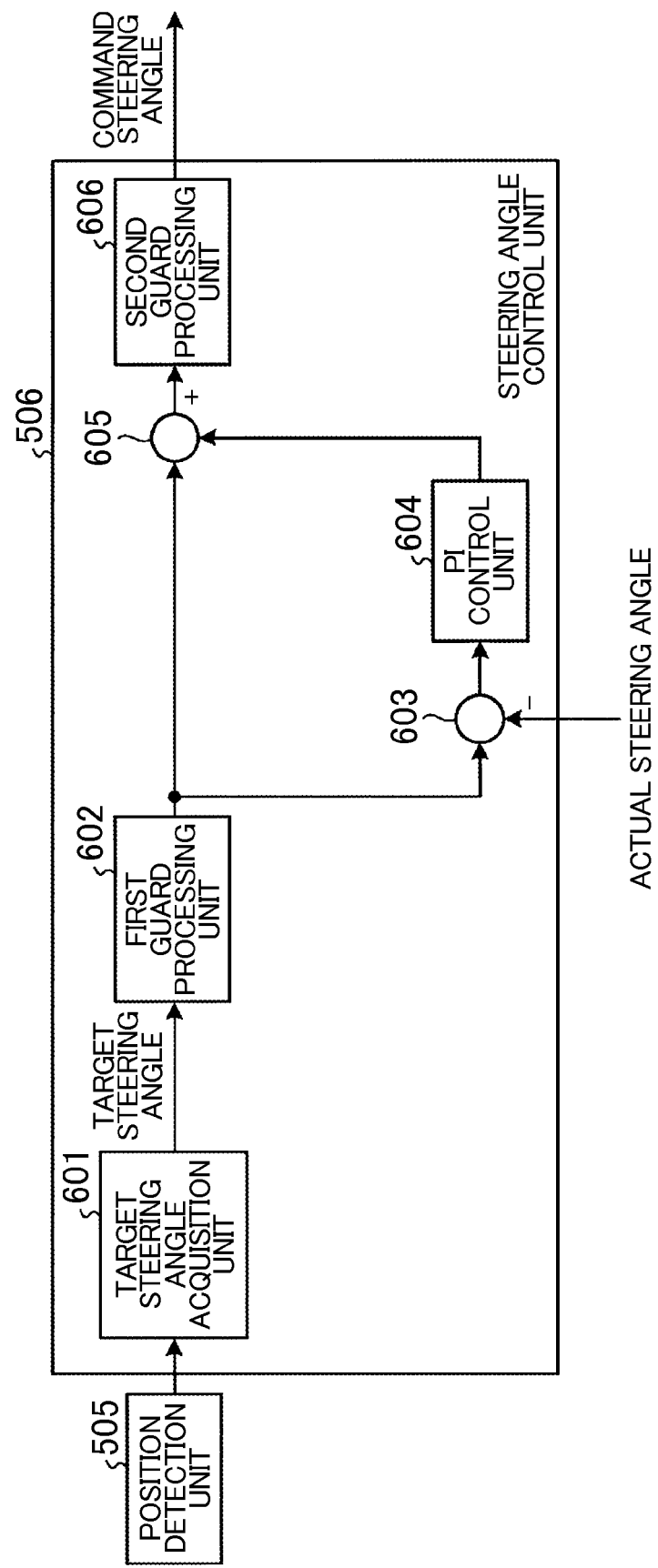
FIG. 6 is a block diagram that shows the configuration of a steering angle control unit according to the embodiment.

Next, the configuration of the steering angle control unit will be described. FIG. 6 is a block diagram that shows the configuration of the steering angle control unit 506 according to the present embodiment. As shown in FIG. 6, the steering angle control unit 506 includes a target steering angle acquisition unit 601, a first guard processing unit 602, a first computing unit 603, a PI control unit 604, a second computing unit 605 and a second guard processing unit 606.

The target steering angle acquisition unit 601 acquires a target steering angle, set as a target to move the vehicle 1, on the basis of the moving path generated by the path generation unit 504 and the current position of the vehicle 1, detected by the position detection unit 505.

The first guard processing unit 602 adjusts the target steering angle acquired by the target steering angle acquisition unit 601 such that the target steering angle does not exceed a guard value determined in order to inhibit a change in the steering angle of the vehicle, larger than or equal to a predetermined reference (first reference). Thus, the adjusted steering angle is output to the steering system 13 in order for the steering system 13 to control the steering angle to the adjusted steering angle. The predetermined reference (first reference) is a reference determined in order to prevent an occupant's discomfort due to an abrupt change in steering angle, and is a reference that is set on the basis of actual measurement, or the like.

In addition, the first guard processing unit 602 changes the guard value for adjusting the target steering angle in response to a situation of the vehicle 1. The present embodiment is an example in which the guard value is changed in response to the steering angle of the vehicle 1.

Figure 7:
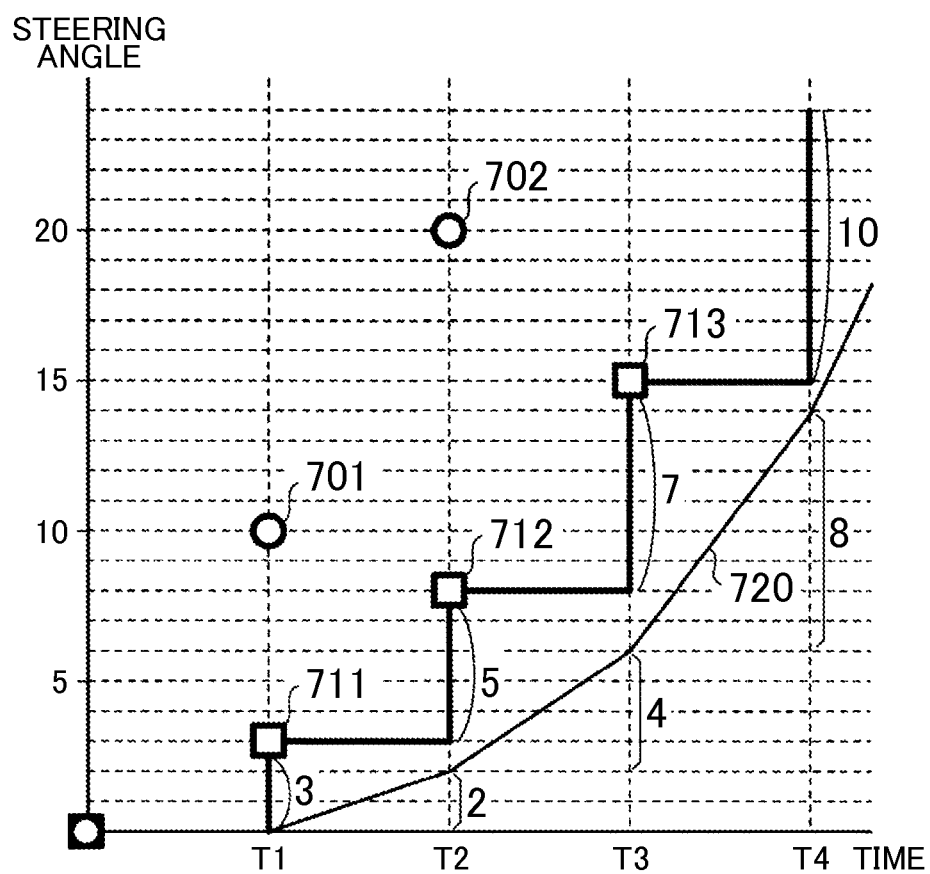
FIG. 7 is a graph that illustrates the relationship between a target steering angle and a guard value according to the embodiment.

FIG. 7 is a graph that illustrates the relationship between the target steering angle and the guard value according to the present embodiment. In the example shown in FIG. 7, the circular plots indicate the target steering angles, and the rectangular plots indicate the steering angles adjusted by the first guard processing unit 602. A transition 720 is a transition of the actual steering angle of the vehicle 1.

In the example shown in FIG. 7, the steering angle adjusted by the first guard processing unit 602 is output to the steering system 13 as the command steering angle. In the present embodiment, the positive direction of the steering angle corresponds to the right-side direction of the wheels, and the negative direction of the steering angle corresponds to the left-side direction of the wheels.

In the example shown in FIG. 7, at time 0, the target steering angle, the adjusted steering angle and the actual steering angle are also zero. That is, the vehicle 1 is traveling straight ahead.

The value of a target steering angle 701 is 10 at time T1, the value of a target steering angle 702 is 20 at time T2, and the value of a target steering angle (not shown) is 30 at time T3. The numeric values of the steering angles shown in FIG. 7 are shown for the sake of easy description. In addition, time T1, time T2 and time T3 each are time a unit time has elapsed from the last time.

There is a possibility that abrupt steering is performed if the steering system 13 performs steering in accordance with the above target steering angles 701, 702, and the like. The first guard processing unit 602 according to the present embodiment limits the target steering angle such that a steering angle larger than the guard value is not output.

In FIG. 7, the first guard processing unit 602 sets a guard value 711 at time T1, a guard value 712 at time T2 and a guard value 713 at time T3.

The guard values 711, 712, 713 shown in FIG. 7 are set on the basis of the actual steering angle, and, more specifically, set on the basis of the amount of increase in actual steering angle. That is, the first guard processing unit 602 sets a guard value once every unit time on the basis of a predetermined width of the guard value and the amount of increase in actual steering angle, that is, the steering speed.

In the present embodiment, the first guard processing unit 602 calculates a guard value (first guard value) by the following mathematical expression (1).

Current guard value(first guard value)=Last command steering angle+Predetermined width of guard value "3"+Amount of increase in actual steering angle (1)

That is, at time T1, the first guard processing unit 602 calculates the guard value "3" by adding the predetermined width "3" of the guard value to the command steering angle "0" at time 0. The guard value (first guard value) "3" is used instead of the target steering angle.

Subsequently, at time T2, it is assumed that the actual steering angle is increased to "2" because the guard value (first guard value) "3" is used as the command steering angle. The first guard processing unit 602 sets a value, obtained by adding the amount of increase in actual steering angle (steering speed) "2" to the predetermined width "3" of the guard value, for the amount of increase "5", and calculates the guard value (first guard value) "8" by adding the command steering angle "3" to the amount of increase "5". The guard value (first guard value) "8" is used instead of the target steering angle.

At time T3, it is assumed that the actual steering angle is increased to "6" because the guard value (first guard value) "8" is used as the command steering angle. The first guard processing unit 602 sets a value, obtained by adding the amount of increase in actual steering angle (steering speed) "4" (Current actual steering angle "6"—Last actual steering angle"2") to the predetermined width "3" of the guard value, for the amount of increase "7", and calculates the guard value (first guard value) "15" by adding the last command steering angle "8" to the amount of increase "7". The guard value (first guard value) "15" is used instead of the target steering angle.

The first guard processing unit 602 sets the guard value such that a variation in the guard value per unit time increases as the steering speed (variation in actual steering angle per unit time), which is controlled by the steering system 13, increases.

In this way, because the guard value is set on the basis of the steering speed, it is possible to suppress an abrupt change in lateral G to an occupant. Thus, it is possible to prevent occupant's fright or discomfort based on an abrupt change in lateral G.

In the present embodiment, the variation in guard value is increased as the steering speed increases. Therefore, when the vehicle 1 attempts to continue turning in a certain direction, it is possible to execute control for gradually increasing the steering angle for turning in that direction. That is, in the present embodiment, it is possible to achieve both inhibition of an abrupt change in lateral G and the turning performance of the vehicle 1.

Next, the case where the target steering angle has switched to an opposite direction (from the right-side direction to the left-side direction) will be described. In such a case, the target steering angle switches from an increase to a reduction or from a reduction to an increase. In this case as well, the first guard processing unit 602 sets a guard value (second guard value) in the opposite direction such that an abrupt change in lateral G does not occur.

Figure 8:
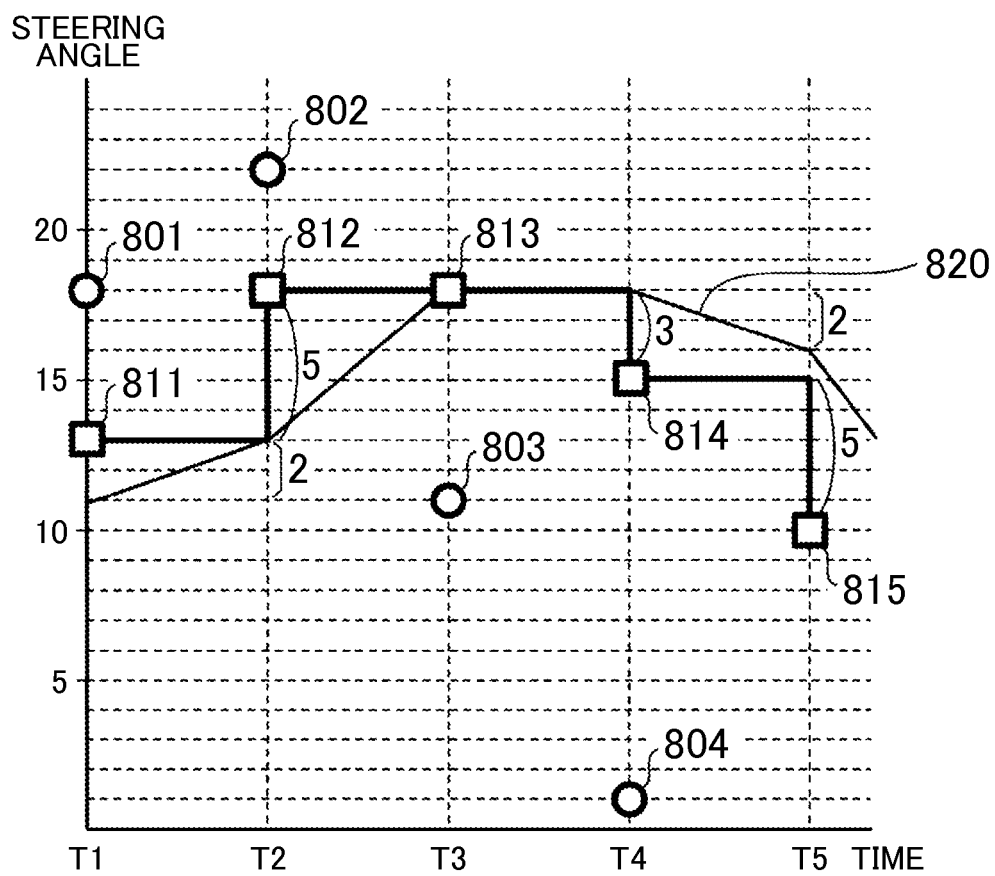
FIG. 8 is a graph that illustrate the relationship between a target steering angle and a guard value according to the embodiment.

FIG. 8 is a graph that illustrates the relationship between the target steering angle and the guard value according to the present embodiment. In the example shown in FIG. 8, the circular plots indicate the target steering angles, and the rectangular plots indicate the steering angles adjusted by the first guard processing unit 602. A transition 820 is a transition of the actual steering angle of the vehicle 1. In the example of FIG. 8, the steering angle adjusted by the first guard processing unit 602 is output to the steering system 13 as the command steering angle.

The target steering angle increases to the value "18" of a target steering angle 801 at time T1 and the value "22" of a target steering angle 802 at time T2; however, the target steering angle reduces to the value "11" of a target steering angle 803 at time T3 and the value "1" of a target steering angle 804 at time T4. Time T1, time T2, time T3 and time T4 each are time a unit time has elapsed from the last time.

If existing steering is performed in accordance with the above target steering angles 801 to 804, the steering wheel is turned to increase its steering angle and then abruptly returned. Thus, there is a possibility that an abrupt change in lateral G is exerted on an occupant. The first guard processing unit 602 according to the present embodiment sets a guard value (second guard value) such that an abrupt change in lateral G does not occur and then executes control such that a steering angle larger than the guard value (second guard value) is not output.

In FIG. 8, the first guard processing unit 602 sets a value "13" for a guard value 811 at time T1, a value "18" for a guard value 812 at time T2, a value "20" for a guard value at time T3, a value "15" for a guard value 814 at time T4, and a value "10" for a guard value 815 at time T5.

In the example shown in FIG. 8, the target steering angle increases to time T2; however, the target steering angle reduces after time T2. The first guard processing unit 602 sets the guard value (first guard value) 812 for stopping a change of the steering angle in the positive direction at time T2 at which the target steering angle turns to a reduction, and then, after time T3, sets the guard value (second guard value) on the basis of a (negative-side) variation in actual steering angle, that is, a steering speed, and the width "−3" of the guard value.

Current guard value(second guard value)=Last command steering angle+Predetermined width of guard value "−3"+Amount of increase in actual steering angle In this way, when the target steering angle switches from an arbitrary direction to a direction opposite to the arbitrary direction, the first guard processing unit 602 according to the present embodiment executes control for stopping a change of the actual steering angle and then sets the guard value (second guard value) on the basis of the width of the guard value in the opposite direction and the variation in actual steering angle.

In this way, the first guard processing unit 602 adjusts the target steering angle such that the target steering angle does not exceed a first guard value determined in order to inhibit a change in the steering angle of the vehicle 1, larger than or equal to a predetermined reference (second reference) in a first direction (for example, right-side direction), and then, at the time when the direction in which the target steering angle is changing switches from the first direction to a second direction (for example, left-side direction) that is a direction opposite to the first direction, adjusts the target steering angle such that the target steering angle does not exceed a second guard value determined in order to inhibit an abrupt change in the steering angle of the vehicle 1 in the second direction. The predetermined reference (second reference) is a reference determined in advance in order to prevent an occupant's discomfort due to an abrupt change in steering angle, and is a reference that is set on the basis of actual measurement, or the like.

The first guard processing unit 602 outputs the set guard value as the adjusted target steering angle.

The first guard processing unit 602 may compare the set guard value with the input target steering angle and, when it is determined that the input target steering angle causes a smaller variation in actual steering angle, may output the target steering angle.

Referring back to FIG. 6, the first computing unit 603 calculates a difference between the target steering angle adjusted by the first guard processing unit 602 and the actual steering angle (steering angle information) of the vehicle 1, acquired by the sensor information acquisition unit 501.

The PI control unit 604 calculates a feedback correction amount for the steering angle by executing PI control over the difference in steering angle, calculated by the first computing unit 603.

The second computing unit 605 calculates a command steering angle to be output to the steering system 13 by adding the feedback correction amount to the target steering angle adjusted by the first guard processing unit 602.

That is, the steering angle control unit 506 corrects the command steering angle to be output to the steering system 13 on the basis of the difference between the target steering angle and the actual steering angle of the vehicle 1, acquired by the sensor information acquisition unit 501. Thus, it is possible to improve the accuracy at the time when the vehicle 1 moves along the moving path.

The second guard processing unit 606 determines whether the input command steering angle exceeds a preset threshold. When the second guard processing unit 606 determines that the input command steering angle exceeds the preset threshold, the second guard processing unit 606 adjusts the command steering angle such that the command steering angle does not exceed the threshold, and then outputs the command steering angle. When the second guard processing unit 606 determines that the input command steering angle does not exceed the preset threshold, the second guard processing unit 606 outputs the input command steering angle.

In the present embodiment, the example in which the target steering angle is adjusted on the basis of the guard value that changes in response to the actual steering angle before feedback is described. Instead, the target steering angle may be adjusted on the basis of the guard value that changes in response to the actual steering angle after feedback. For example, the target steering angle may be adjusted in the second guard processing unit 606.

Figure 9:
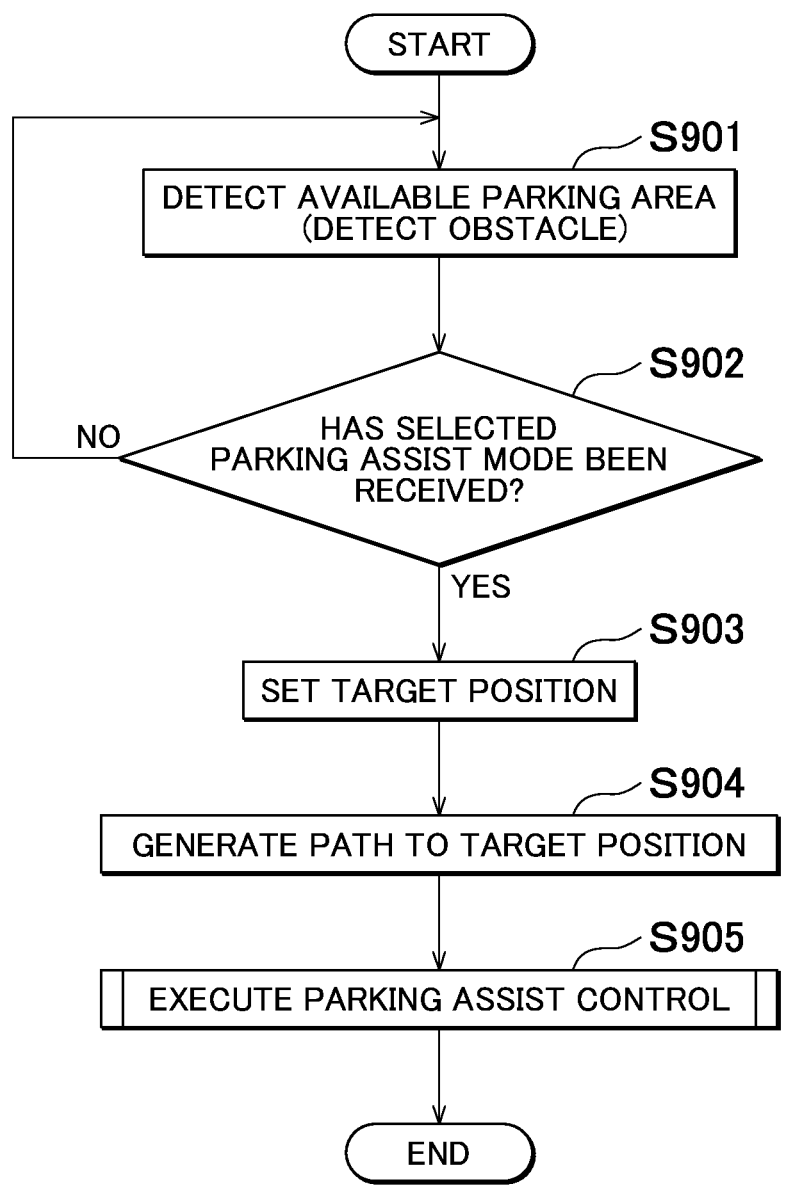
FIG. 9 is a flowchart that shows the procedure of a process until the process shifts into parking assist control in the ECU according to the embodiment.

Next, a process until the process shifts into parking assist control in the ECU 14 of the vehicle 1 according to the present embodiment will be described. FIG. 9 is a flowchart that shows the procedure of the above-described process in the ECU 14 according to the present embodiment.

Initially, the detection unit 502 detects an obstacle and also detects an area in which the vehicle 1 is allowed to be parked on the basis of the measured distance information acquired by the sensor information acquisition unit 501 (step S901).

The ECU 14 determines whether a selected parking assist mode has been received from the driver via the operation input unit 10 (step S902). When the ECU 14 determines that a selected parking assist mode has not been received from the driver (No in step S902), an obstacle, or the like, is detected in step S901 again on the assumption that the vehicle 1 continues ordinary traveling.

On the other hand, when the ECU 14 determines that a selected parking assist mode has been received from the driver via the operation input unit 10 (Yes in step S902), the target position setting unit 503 sets a target position for parking the vehicle 1 from among the available parking area detected in step S901 (step S903). In the present embodiment, when there are a plurality of the available parking areas, the available parking area is selected by the driver and received; however, the target position setting unit 503 may automatically select the available parking area.

The path generation unit 504 generates a moving path to the target position of the vehicle 1 (step S904).

Subsequently, the ECU 14 executes parking assist control for moving the vehicle 1 to the target position on the basis of the generated moving path (step S905).

Figure 10:
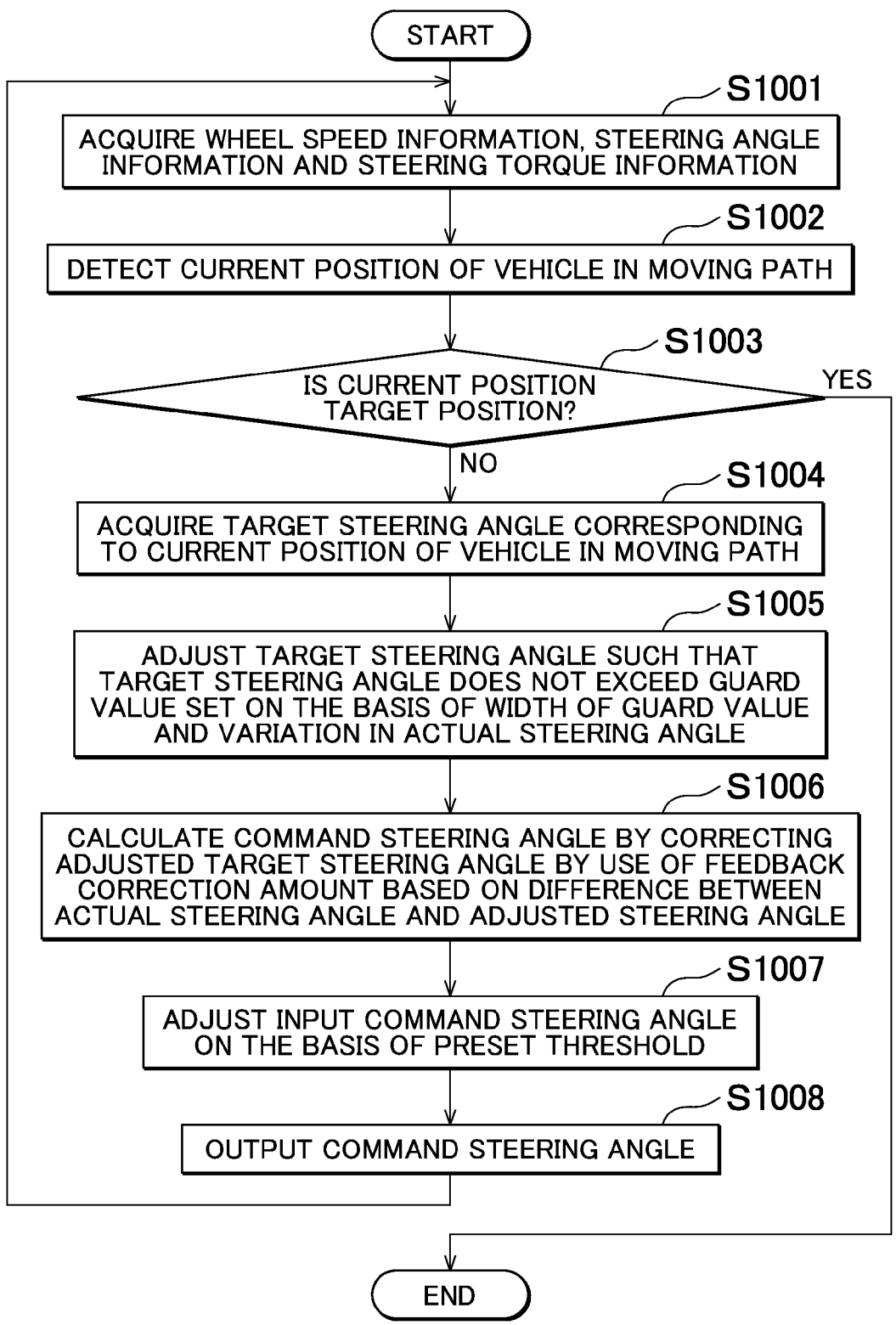
FIG. 10 is a flowchart that shows the procedure of parking assist control in the ECU according to the embodiment.

Thus, parking assist control is started by the ECU 14. Next, parking assist control that is executed in step S905 of FIG. 9 in the ECU 14 of the vehicle 1 according to the present embodiment will be described. FIG. 10 is a flowchart that shows the procedure of the above-described process in the ECU 14 according to the present embodiment.

Initially, the sensor information acquisition unit 501 acquires various pieces of information, such as at least the wheel speed information, the steering angle information and the steering torque information, from the various sensors (step S1001). At this time, the speed of the vehicle 1 is acquired from the wheel speed information. In addition, the acceleration is acquired from the acceleration sensor.

Subsequently, the position detection unit 505 detects the current position of the vehicle 1 on the basis of the various pieces of information acquired by the sensor information acquisition unit 501 (step S1002).

The ECU 14 determines whether the detected current position is the target position (step S1003).

When the ECU 14 determines that the detected current position is not the target position (No in step S1003), the target steering angle acquisition unit 601 of the steering angle control unit 506 acquires a target steering angle corresponding to the position of the vehicle in the current moving path on the basis of the moving path and the current position (step S1004).

The first guard processing unit 602 adjusts the target steering angle such that the target steering angle does not exceed the guard value set on the basis of the width of the guard value and a variation in actual steering angle (step S1005).

In addition, the first computing unit 603 calculates the difference between the adjusted target steering angle and the actual steering angle, the PI control unit 604 calculates a feedback correction amount by executing PI control over the difference, and then the second computing unit 605 calculates a command steering angle by correcting the target steering angle by the use of the feedback correction amount (by subtracting the feedback correction amount from the target steering angle) (step S1006).

The second guard processing unit 606 adjusts the input command steering angle on the basis of the preset threshold (step S1007). The second guard processing unit 606 outputs the command steering angle to the steering system 13 (step S1008). Thus, in the steering system 13, steering control based on the command steering angle is executed.

On the other hand, when the ECU 14 determines in step S1003 that the detected current position is the target position (Yes in step S1003), the ECU 14 ends the process.

With the above-described procedure, it is possible to output the command steering angle adjusted such that a lateral G does not abruptly change. Thus, in steering control over the steering system 13, it is possible to improve the accuracy that the vehicle 1 moves along the moving path.

The above embodiment of the invention provides the parking assist system 100 for the vehicle 1. The parking assist system 100 includes the steering system 13 and the ECU 14. The steering system 13 is configured to control a steering angle of a wheel of the vehicle. The ECU 14 is configured to acquire the target steering angle set as the target to move the vehicle 1, adjust the acquired target steering angle such that the target steering angle does not exceed the first guard value determined in order to inhibit a change in the steering angle of the vehicle 1, larger than or equal to the first reference, output the adjusted target steering angle to the steering system 13 in order for the steering system 13 to control the steering angle to the adjusted target steering angle, and change the first guard value in response to a situation of the vehicle 1. Thus, for example, it is possible to provide a ride comfort to an occupant by inhibiting an abrupt change in the steering angle of the vehicle 1.

In the parking assist system 100 according to the above embodiment, the ECU 14 may be configured to change the first guard value on the basis of an actual steering angle of the vehicle 1, which is a controlled result of the steering system 13, as the situation of the vehicle 1. Thus, for example, it is possible to provide a ride comfort to an occupant by changing the first guard value on the basis of the actual steering angle.

In the parking assist system 100 according to the above embodiment, the ECU 14 may be configured to change the first guard value on the basis of a rate at which the actual steering angle of the vehicle 1 changes in accordance with control of the steering system 13, as the situation of the vehicle 1. Thus, for example, it is possible to provide a ride comfort to an occupant by changing the first guard value on the basis of the rate at which the actual steering angle changes.

In the parking assist system 100 according to the above embodiment, the ECU 14 may be configured to set the first guard value such that a variation in the first guard value per unit time increases as a variation in the actual steering angle per unit time controlled by the steering system 13. Thus, for example, it is possible to improve the moving performance of the vehicle 1 together with a ride comfort for an occupant by increasing the variation in the first guard value per unit time.

In the parking assist system 100 according to the above embodiment, the ECU 14 may be configured to adjust the target steering angle such that the target steering angle does not exceed the first guard value determined in order to inhibit a change in the steering angle of the vehicle 1 in the first direction, larger than or equal to the first reference, and then, at the time when a direction in which the target steering angle is changing switches from the first direction to the second direction that is a direction opposite to the first direction, adjust the target steering angle such that the target steering angle does not exceed the second guard value determined in order to inhibit a change in the steering angle of the vehicle 1 in the second direction, larger than or equal to the second reference. Thus, for example, it is possible to provide a ride comfort to an occupant by, when the direction of the steering angle has changed, inhibiting an abrupt change in the steering angle in that direction.

In the above-described embodiment, the case where the width of the guard value to increase or reduce is ±3 at the time when the guard value is changed is described. However, the above-described embodiment does not limit the width of the guard value to increase or reduce to ±3. In an alternative embodiment, an example in which the width of the guard value is changed will be described. Components of the alternative embodiment are similar to those of the above-described embodiment, and the description thereof is omitted.

The first guard processing unit 602 according to the above-described embodiment uses the guard value derived by using the actual steering angle and the width of the guard value, which is fixed to "±3". In contrast, the first guard processing unit 602 according to the present alternative embodiment is configured to be able to change the width of the guard value.

In the present alternative embodiment, the speed of the vehicle is used as the situation of the vehicle 1 for changing the width of the guard value. That is, as the speed of the vehicle increases, a change in lateral G increases. The first guard processing unit 602 according to the present alternative embodiment sets the width of the guard value such that the width of the guard value reduces as the vehicle speed increases. For example, as the vehicle speed increases, the width of the guard value is changed in order of "±3", "±2" and "±1".

In this way, in the present alternative embodiment, the width of the guard value is adjusted on the basis of the speed of the vehicle 1. Thus, it is possible to suppress a change in lateral G that is supposed to increase as the speed of the vehicle 1 increases, so it is possible to provide a ride comfort to an occupant.

As described above, according to the above-described embodiment and alternative embodiment, the target steering angle set in accordance with the moving path is adjusted so as not to exceed the guard value that is changed in response to the situation (for example, steering speed) of the vehicle, so it is possible to provide a ride comfort to an occupant by suppressing an abrupt change in lateral G.

In addition, in the present embodiment, at the time of inhibiting an abrupt change in lateral G, the guard value increases as the steering speed of the vehicle 1 increases, so it is possible to improve the turning performance of the vehicle 1.

Some embodiments of the invention are described above; however, these embodiments are only illustrative and not intended to limit the scope of the invention. These novel embodiments may be implemented in other various forms, and may be variously omitted, replaced or changed without departing from the spirit of the invention. The scope and spirit of the invention encompass these embodiments and their modifications, and the invention described in the appended claims and equivalents thereof encompass these embodiments and their modifications.

For example, the control unit (for example, the steering angle control unit) changes the width of change in the first guard value per unit time in response to the speed of the vehicle.

What is claimed is:

1. A control system for a vehicle, comprising:
an actuator that adjusts a steering angle of a wheel of the vehicle;
a steering control unit configured to control the actuator to adjust the steering angle of the wheel of the vehicle; and
an electronic control unit configured to acquire a target steering angle set as a target to move the vehicle,
upon a determination that the absolute value of the acquired target steering ankle exceeds a guard value, adjust the acquired target steering angle such that the absolute value of the target steering angle does not exceed the guard value, the guard value being determined to inhibit a change in the steering angle of the vehicle larger than or equal to a first reference, output the adjusted target steering angle to the steering control unit to control the steering angle to the adjusted target steering angle, and change the guard value in response to a situation of the vehicle; and upon a determination that the absolute value of the acquired target steering angle does not exceed the guard value, output the acquired target steering angle to the steering control unit for the steering control unit to control the steering angle to the acquired target steering angle;

wherein the electronic control unit is configured to set the guard value for a current time period by adding together the guard value at a most recent previous time period with a predetermined guard value width and with a value representing an amount of increase in an actual steering angle of the vehicle from the most recent previous time period to the current time period.

2. The control system according to claim 1, wherein the electronic control unit is configured to adjust the target steering angle such that the absolute value of the target steering angle does not exceed the guard value determined to inhibit a change in the steering angle of the vehicle in a first direction, and then, at the time when a direction in which the target steering angle is changed and switches from the first direction to a second direction that is a direction opposite to the first direction, adjust the target steering angle such that the absolute value of the target steering angle is not lower than another guard value determined to inhibit a change in the steering angle of the vehicle in the second direction, larger than or equal to a second reference.

* * * * *